(12) United States Patent
Kim et al.

(10) Patent No.: US 7,418,117 B2
(45) Date of Patent: Aug. 26, 2008

(54) LIQUID CRYSTAL DISPLAY DEVICE PERFORMING BOTH IMAGE DISPLAY MODE AND FINGERPRINT RECOGNITION MODE

(75) Inventors: Choong Hoo Kim, Seoul (KR); Kyu Chang Park, Seoul (KR); Min Soo Shim, Seoul (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 616 days.

(21) Appl. No.: 10/331,530

(22) Filed: Dec. 30, 2002

(65) Prior Publication Data

US 2003/0174870 A1 Sep. 18, 2003

(30) Foreign Application Priority Data

Mar. 12, 2002 (KR) .................. 10-2002-0013198

(51) Int. Cl.
*G05B 19/00* (2006.01)
*G06K 9/22* (2006.01)
*G06K 9/00* (2006.01)
*G02F 1/133* (2006.01)
*G02F 1/136* (2006.01)

(52) U.S. Cl. .................. 382/124; 382/313; 340/5.53; 340/5.83; 349/33; 349/42

(58) Field of Classification Search .................. 382/124, 382/115
See application file for complete search history.

(56) References Cited

U.S. PATENT DOCUMENTS

| 5,325,442 A | 6/1994 | Knapp |
| 5,819,103 A | 10/1998 | Endoh et al. |
| 5,907,627 A | 5/1999 | Borza |
| 6,083,353 A | 7/2000 | Alexander, Jr. |
| 6,122,737 A | 9/2000 | Bjorn et al. |
| 6,125,192 A | 9/2000 | Bjorn et al. |
| 6,182,892 B1 | 2/2001 | Angelo et al. |
| 6,229,906 B1 | 5/2001 | Pu et al. |
| 6,237,461 B1 | 5/2001 | Poole |
| 6,373,967 B2 | 4/2002 | Pu et al. |

(Continued)

FOREIGN PATENT DOCUMENTS

JP 59-116618 7/1984

(Continued)

*Primary Examiner*—Brian P. Werner
*Assistant Examiner*—Kathleen S Yuan
(74) *Attorney, Agent, or Firm*—Ladas & Parry LLP

(57) ABSTRACT

Disclosed is a liquid crystal display device of novel construction, in which a fingerprint recognition device is integrally formed with the liquid crystal display device, thereby minimizing the increase in the price and size of a final product. The liquid crystal display device comprises an image display panel and a fingerprint recognition panel which are integrally formed, wherein the image display panel comprises a scan drive unit which sequentially turns on rows formed in the image display panel for each frame in order to display images, and a data drive unit which outputs data signals to a turned-on row provided in the image display panel, and wherein the fingerprint recognition panel comprises a switch control unit which sequentially turns on rows formed in the fingerprint recognition panel for each frame in order to perform fingerprint recognition, and a reading unit, to which fingerprint information recognized from a turned-on row is outputted.

6 Claims, 4 Drawing Sheets

U.S. PATENT DOCUMENTS

| | | | |
|---|---|---|---|
| 2002/0163601 A1* | 11/2002 | Min et al. | 349/33 |
| 2002/0180585 A1* | 12/2002 | Kim et al. | 340/5.53 |
| 2006/0017862 A1* | 1/2006 | Song et al. | 349/42 |

FOREIGN PATENT DOCUMENTS

| | | |
|---|---|---|
| JP | 6-18846 | 1/1994 |
| JP | 6-301482 | 10/1994 |
| JP | 7-203157 | 8/1995 |
| JP | 9-160063 | 6/1997 |
| JP | 11-125841 | 5/1999 |
| JP | 11-160729 | 6/1999 |
| JP | 11-326954 | 11/1999 |
| JP | 2001-77342 | 3/2001 |
| JP | 2001-109394 | 4/2001 |

* cited by examiner

LIQUID CRYSTAL DISPLAY DEVICE PERFORMING BOTH IMAGE DISPLAY MODE AND FINGERPRINT RECOGNITION MODE

BACKGROUND OF THE INVENTION

1. Field of the Invention

The present invention relates to a liquid crystal display device, and more particularly to a liquid crystal display device capable of performing both image display mode and fingerprint recognition mode. The liquid crystal display device according to the present invention is more effective than a piezoelectric sensor or an optical sensor, which uses one or more semiconductor components and is generally employed in fingerprint recognition-based security/authentication techniques, in view of reliability and costs. Furthermore, the present invention is directly applicable to STN or TFT-LCD products which themselves have a very wide applicability, so that it can be employed in an electronic commerce system, a security system, a personal recognition/authentication system or the like.

2. Description of the Prior Art

As generally known in the art, password input mode has been principally used for electronic commerce, security, authentication and the like, up to the present. However, since the password input mode is likely to be hacked into, various modes have been developed lately for recognizing biometrical information such as fingerprints.

FIG. 1 is a longitudinal section view of a unit cell in a conventional fingerprint recognition device, which employs thin film transistors (TFTs), and FIG. 2 shows a circuit for driving such a fingerprint recognition device. As shown in FIG. 1, a unit cell of the conventional fingerprint recognition device 100 comprises: a sensor TFT 102 for sensing light; a switch TFT 106 for outputting recognized fingerprint information, the sensor TFT and the switch TFT being transversely aligned; a transparent substrate 118; and a backlight 116 for emitting light upward from the underside of the transparent substrate 118, the light passing through an electricity charging unit or a light transmission part 104. A sensor source electrode 112 of the sensor TFT 102 and a switch drain electrode 128 of the switch TFT 106 are electrically connected to each other through a first transparent electrode 124. A second transparent electrode 120 is connected to a sensor gate electrode 114 of the sensor TFT 102. In addition, a photosensitive layer 110 such as amorphous silicon (a-Si:H) is formed between the sensor drain electrode 108 and the sensor source electrode 112, so that the sensor drain electrode 108 and the sensor source electrode 112 become electrically conductive if a predetermined amount of light is incident into the photosensitive layer 110. If a fingerprint is in contact with a coating 126 formed on the top of the unit cell, the light generated from the backlight 116 underneath the transparent substrate 118 is reflected along the pattern of the fingerprint and received by the photosensitive layer 110 of the sensor TFT 102, thereby rendering the TFT 102 to be electrically conductive. A dielectric insulation film 126 functions to isolate the second electrode 124, the sensor gate electrode 114 and the switch gate electrode 136.

Meanwhile, the switch TFT 106 is switched frame by frame, the frames being set to scan a fingerprint by a gate control signal applied to the switch gate electrode 136. Consequently, each sensor TFT 102 scans a fingerprint image inputted into the fingerprint recognition device 100, thereby forming a frame. The fingerprint image scanned in this manner is outputted via the switch source electrode 132. A photosensitive layer 134 is also formed in the switch TFT 106 as in the sensor TFT during the manufacturing process of the fingerprint recognition sensor, but a light shut-off layer 129 is formed on a protective layer 130 so that the switch TFT 106 is not turned on by the light received in the photosensitive layer 134.

Referring to FIG. 2, if a TFT sensor 202, which consists of a light-emitting unit 204, a panel 206 and a coating 208, is turned on by a gate drive unit 210 to scan a fingerprint as described above, fingerprint image information is inputted into a reading unit 212, sent to a control unit 214 and then compared with fingerprint data which has already been inputted into a memory 216. The result of the comparison is sent to a sensor interface 220 of a host computer, so that a process related to security and authentication then proceeds.

FIG. 3 is an equivalent circuit diagram for an array of conventional fingerprint recognition components. As shown in FIG. 3, a unit cell comprises a sensor TFT 302 and a switch TFT 304, and the capacitance existing at the connection between the sensor TFT 302 and the switch TFT 304 is modeled by a capacitor 305. As shown in FIG. 3, lines 306_1 and 306_2 are connected to the gate of the switch TFT 304, and line 308 is connected to the gate of the sensor TFT 302. Line 310 is a data line of the sensor TFT 302 and line 312 functions to outwardly discharge static electricity which may be generated in the light shut-off layer 129 (FIG. 1).

The afore-mentioned fingerprint recognition devices should be separately provided in an electronic commerce system, a security system, a control system and the like. Recently, in connection with the increase of personal portable equipment, mobile phones, personal portable terminals, notebook computers, personal computers and the like, various application techniques have been developed for connecting a fingerprint recognition device with such equipment. However, there is a problem in that the price and volume of a resulting product are increased because it is necessary to buy and mount a separate fingerprint device on a liquid crystal display panel or in a separate space.

SUMMARY OF THE INVENTION

Accordingly, the present invention has been made to solve the above-mentioned problems occurring in the prior art, and an object of the present invention is to provide a liquid crystal display device of novel construction, in which a fingerprint recognition device is integrally formed with the liquid crystal display device, thereby minimizing the increase in the price and size of a resulting product.

In order to accomplish this object, there is provided a liquid crystal display device, capable of performing both image display mode and fingerprint recognition mode, wherein an image display panel and a fingerprint recognition panel are integrally formed, wherein the image display panel comprises a scan drive unit, which sequentially turns on rows formed in the image display panel for each frame in order to display images, and a data drive unit which outputs data signals to the turned-on rows formed in the image display panel, and wherein the fingerprint recognition panel comprises a switch control unit, which sequentially turns on rows provided in the fingerprint recognition panel for each frame in order to perform fingerprint recognition, and a reading unit, to which fingerprint information recognized from the turned-on rows is outputted. The fingerprint recognition panel is formed from an array of fingerprint recognition components, each of the fingerprint recognition components comprising: a sensor thin film transistor, in which a photosensitive layer is formed between a drain and a source of the sensor thin film transistor, and when light exceeding a predetermined amount of light is incident into the photosensitive transistor, the drain and the source become electrically conductive; and a switch thin film transistor, in which a gate of the switch thin film transistor is connected to the output terminal of the switch control unit, a first end of a channel of the switch thin film transistor is connected to a second end of a channel of the sensor thin film transistor and a second end of the channel of the switch thin film is connected to the input terminal of the reading unit.

According to this construction of the present invention, it becomes possible to form a photosensitive sensor device, which comprises a sensor thin film transistor, a switch thin film transistor and an electricity charging unit, in each pixel in the inside of an array substrate, itself comprising one or more active components, or a color filter substrate of a liquid crystal display device. As a result, because both image display and fingerprint recognition can be performed by one liquid display device, it is possible to minimize the increase in price and volume of a final product caused by buying and mounting a separate fingerprinting recognition device.

Preferably, the second end of the channel of the sensor thin film transistor and the first end of the channel of the switch thin film transistor are connected to a transparent electrode. The one sensor thin film transistor and the switch thin film transistor are formed on a transparent substrate, and the liquid crystal display device further comprises a light-emitting unit under the transparent substrate. The liquid crystal display device according to the present invention further comprises an electricity charging unit, wherein one end of the charging unit is connected to the second end of the channel of the sensor thin film transistor and the other end of the charging unit is connected to the first end of the channel of the switch thin film transistor, and electric charges generated from the sensor thin film transistor are accumulated in the electricity charging unit. In addition, the liquid crystal display device further comprises a light shut-off layer formed on the top of the switch thin film transistor.

According to another aspect of the present invention, there is also provided a liquid crystal display device, capable of performing both image display mode and fingerprint recognition mode, wherein an image display panel and a photosensitive panel are integrally formed, wherein the image display panel comprises a scan drive unit which sequentially turns on rows formed in the image display panel for each frame in order to display images, and a data drive unit which outputs data signals to the turned-on rows provided in the image display panel, and wherein the photosensitive panel comprises a switch control unit which sequentially turns on rows formed in the fingerprint recognition panel for each frame in order to perform fingerprint recognition, and a reading unit, to which optical information sensed from the turned-on rows is outputted.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
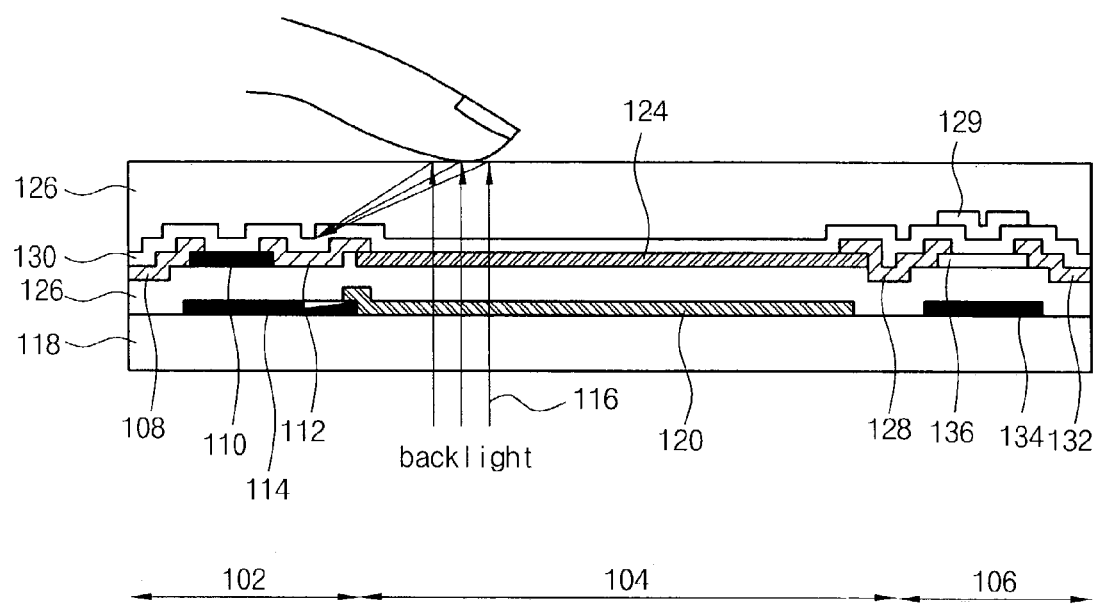
FIG. 1 shows a construction of a unit cell of a conventional fingerprint recognition component.
Figure 2:
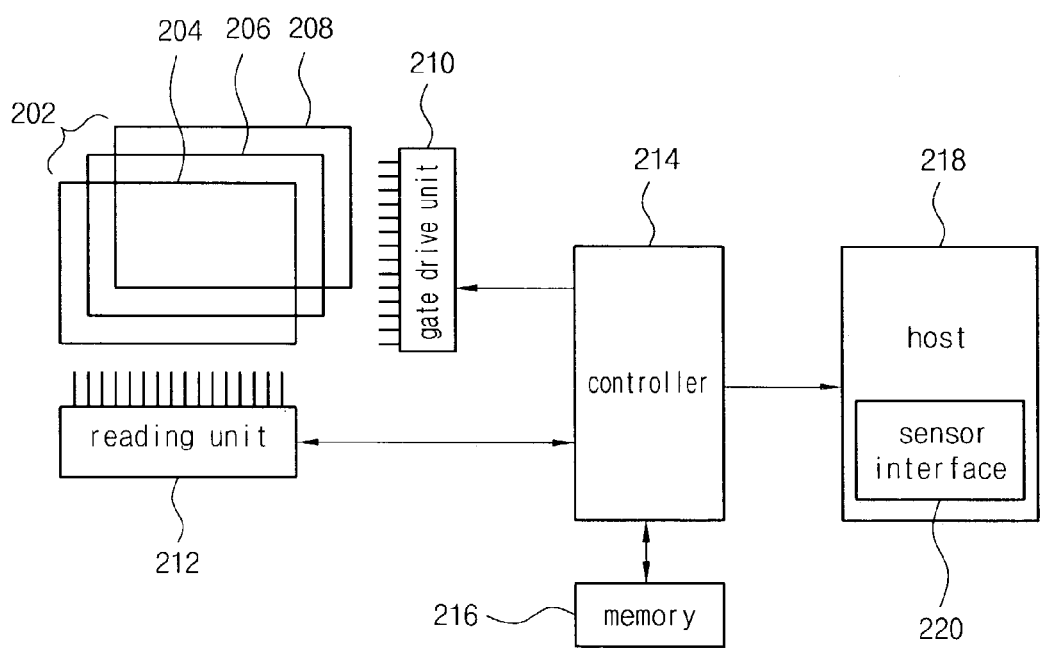
FIG. 2 is a block diagram of a drive unit of the conventional fingerprint recognition component.
Figure 3:
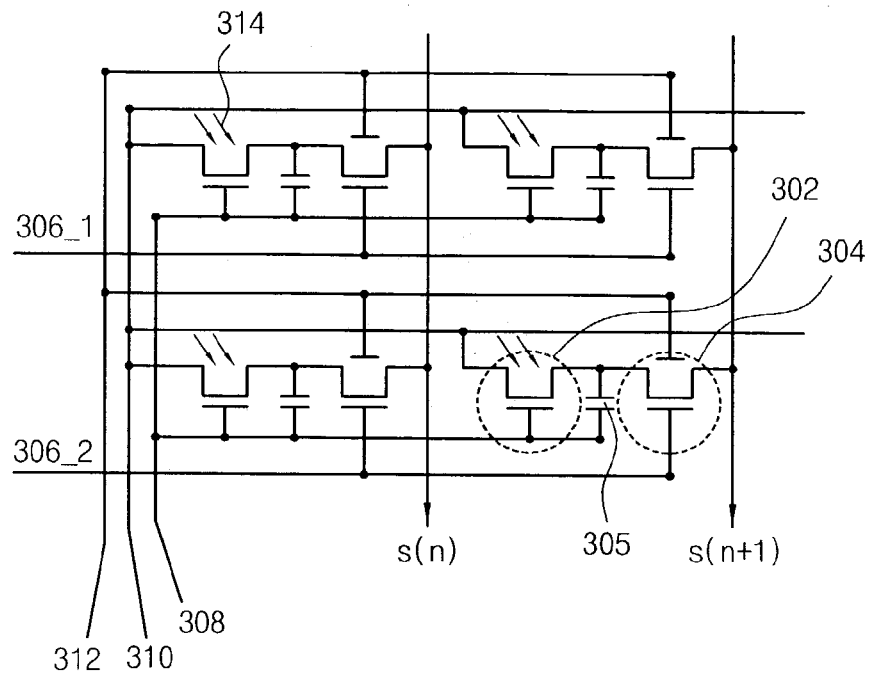
FIG. 3 is a circuit diagram an array of the conventional fingerprint recognition components.

Hereinafter, a preferred embodiment of the present invention will be described with reference to the accompanying drawings. In the following description and drawings, the same reference numerals are used to designate the same or similar components, and so repetition of the description for the same or similar components will be omitted.

Figure 4:
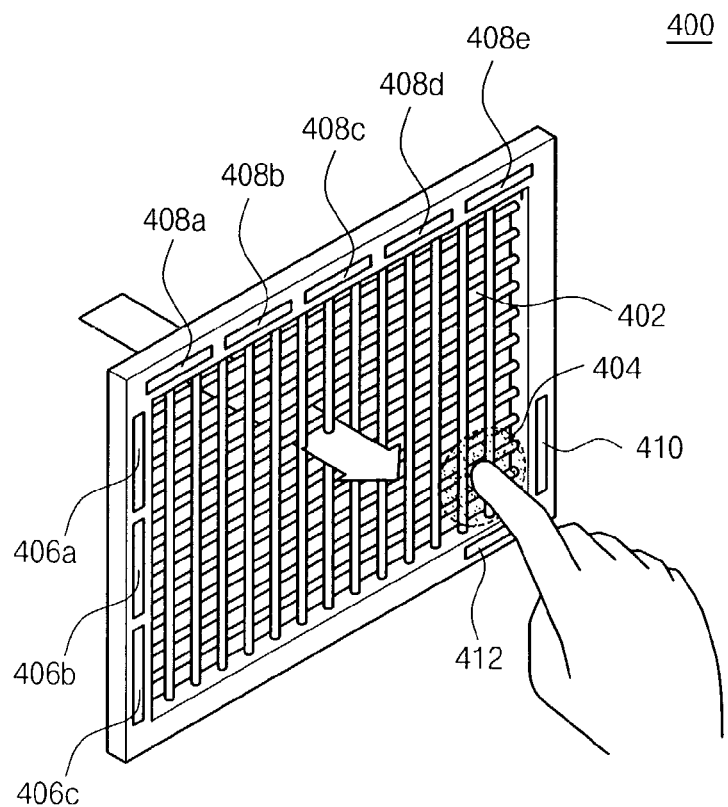
FIG. 4 shows a construction of a liquid crystal display device in accordance with an embodiment of the present invention.

FIG. 4 shows a construction of a liquid crystal display device in accordance with an embodiment of the present invention. The term "liquid display device" used herein is intended to include a device for only displaying images as usual and a device for performing both image display and fingerprint recognition. As shown in FIG. 4, a display panel of a liquid crystal display device 400 is divided into an image display region 402 and a finger print recognition region 404. However, these two regions are formed in one panel. The image display region 402 is the same as a conventional TFT-LCD and will be briefly described with reference to FIG. 6. The image fingerprint recognition region 404 will be described later with reference to FIG. 5. In order to display an image, a scan drive unit 406, the components of which are indicated by reference numerals 406a, 406b, and 406c in the drawing, sequentially outputs turn-on/turn-off signals to the gates of the TFTs, which constitute the image display unit 402, in a corresponding row. A data drive unit 408, the components of which are indicated by reference numerals 408a, 408b, 408c, 408d, and 408e, sequentially outputs data signals for image display to the channels of the TFTs in the one or more rows which have been turned on by the scan driving unit 406. A switch control unit 410 sequentially outputs turn-on/turn-off signals to the gates of the TFTs which constitute the fingerprint recognition region 404 in a corresponding row. Fingerprint information recognized from one or more rows in the fingerprint recognition region 404, which have been turned on by the switch control unit 410, is outputted to a reading unit 412.

Figure 5:
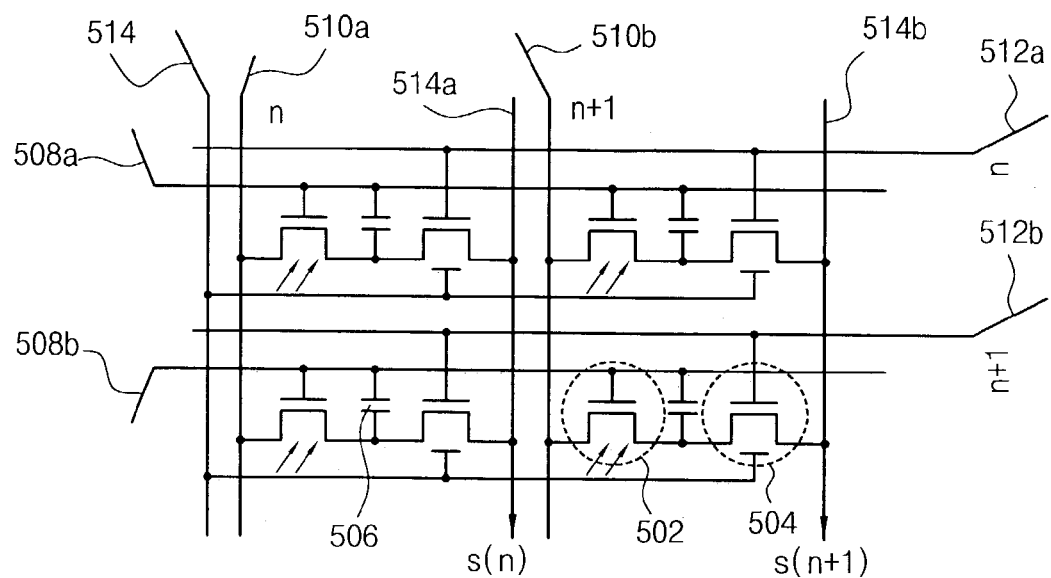
FIG. 5 is a circuit diagram of an array of fingerprint recognition components provided in the liquid crystal display device of FIG. 4.

FIG. 5 is a circuit of an array of fingerprint recognition components which constitutes the fingerprint recognition region 404 in the liquid crystal display device shown in FIG. 4. As shown in FIG. 5, a unit cell comprises a sensor TFT 502, a capacitor 506, and a switch TFT 504. The gate of the sensor TFT 502 is provided with turn-off signals and usually turned off. However, if light reflected by a fingerprint is received, the sensor TFT 502 generates photocurrents. The capacitor 506 stores the photocurrents generated by the sensor TFT 502 in the form of electric charges. The switch TFT 504 is controlled by the switch control unit 410 to selectively output the electric charges stored in the capacitor 506 to the reading unit 412.

A gate of the sensor TFT 502 is connected to the scan drive unit (406) (see the components 406a, 406b, 406c in FIG. 4) via lines 508a, 508b. A first end of a channel of the sensor TFT is connected to the data drive unit (408) (see the components 408a, 408b, 408c, 408d and 408e in FIG. 4) via lines 510a, 510b and the second end of the channel is connected to a first end of a channel of the switch TFT 504. The gate of the switch TFT 504 is connected to the switch control unit 410 (FIG. 4) and the second end of the channel is connected to the reading unit 412 (FIG. 4) via lines 514a, 514b. In FIG. 5, a light shut-off line 514 functions to discharge electric charges so that electric charges are not accumulated in the light shut-off layer (e.g. the light shut-off layer 129 shown in FIG. 1) formed on the switch TFT 504.

Figure 6:
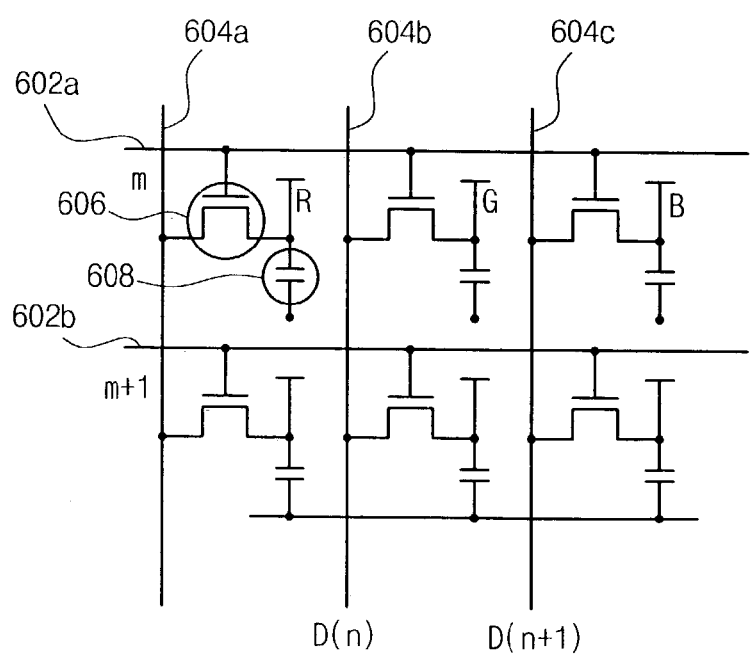
FIG. 6 is a circuit diagram of an array of image display components which forms an image display unit in the liquid display device shown in FIG. 4.

FIG. 6 is a circuit diagram of the array of image display components which constitute the image display unit in the liquid crystal display device of FIG. 4. As shown in FIG. 6, one image display component comprises one TFT 606 and one capacitor 608. The gate of the TFT is connected to the components 406a, 406b, 406c, of the scan drive unit through the gate lines 602a, 602b.

The operation of this embodiment now will be described with reference to FIGS. 4 to 6. At first, in the image display mode, the scan drive unit 406 provides gate signals, which turn on the TFTs of a specific row in the image display region 402 and turns off the TFTs of the other rows. The data drive unit 408 applies data signals for a display image to the first end of the channel of each sensor TFT corresponding to the specific turned-on row. After data signals are applied to all of the sensor TFTs corresponding to the turned-on row, the sensor TFTs of the next row are turned on by the scan drive unit 406 and the data drive unit 408 applies data signals to them. In this manner, all of the rows are scanned and image data signals are applied to the image display region 402 of the liquid crystal panel. Herein, the characteristics of gate/data signals inputted to the sensor TFTs are applied in the same manner as in a conventional driving method of liquid crystal display devices as they have been employed up to the present.

In the fingerprint recognition mode, because turn-off signals are applied to the gates of the sensor TFTs 502, the sensor TFTs 502 are usually turned off. However, as described with reference to FIG. 1, if light emitted from the backlight 116 is reflected by a fingerprint or the like and arrives at the photosensitive layer 110, the sensor TFTs generate photocurrents depending on the amount of light that reaches the photosensitive layer 116 and the photocurrents are stored in the capacitor 506 in the form of electric charges. If the switch TFTs of a specific row are turned on by the switch control unit 410, the electric charges stored in the capacitor 506 are outputted to the reading unit 412 through the channels of the corresponding switch TFTs. Thereafter, the switch TFTs of the next row are turned on by the switch control unit 410 and the electric charges stored in the capacitor 506 are outputted to the reading unit 412 through the corresponding switch TFTs. Through this procedure, it is possible to obtain image information related to the whole fingerprint.

Figure 7:
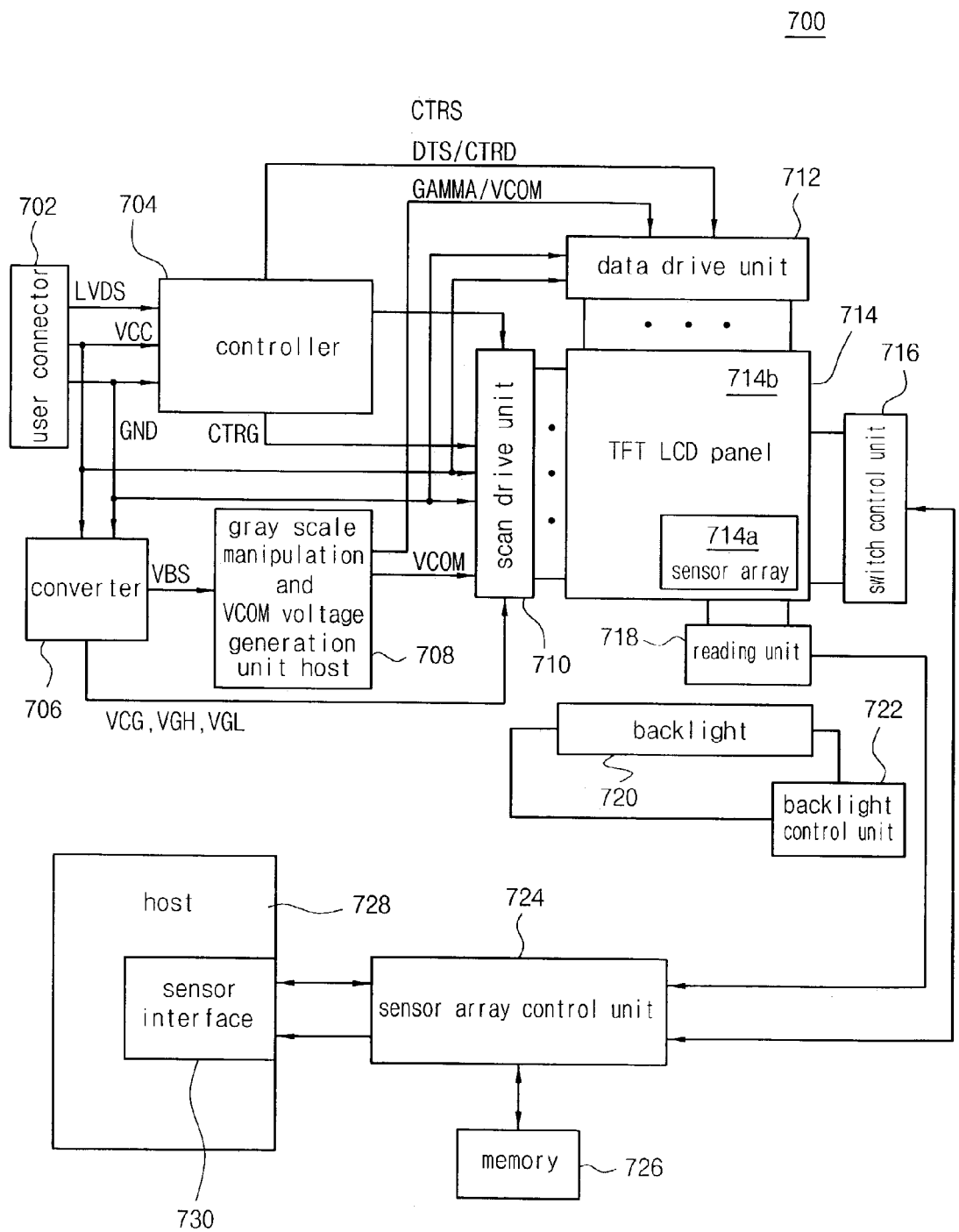
FIG. 7 is a block diagram of a liquid display device in accordance with an embodiment of the present invention.

FIG. 7 is a block diagram of a fingerprint recognition device in accordance with an embodiment of the present invention. As shown in FIG. 7, the whole liquid crystal panel 714 is separated into an image display region 714b and a fingerprint recognition region 714a. In the embodiment shown in FIG. 7, the fingerprint recognition region 714b is formed in the right lower part of the liquid crystal panel 714. Except for the fingerprint recognition region, images are displayed on the image display region 714b in a usual manner. In addition, as shown in FIG. 7, the image display unit 714b is controlled by an LCD panel control unit 708, and the fingerprint recognition region 714a is controlled by a separate sensor array control unit 724. There is additionally provided a fingerprint recognition device 700 comprising: a scan drive unit 714a, a data drive unit 712, a switch control unit 716, a reading unit 718, a user connector 702, a DC/DC converter 706, a gray scale manipulation and VCOM voltage generation unit 708, a backlight 720, a backlight control unit 722, a memory 726, and a host 728 provided with a sensor interface 726.

If the user connector 702 is connected to a power source, an image signal LVDS and source signals VCC, GND are applied to the fingerprint recognition device 700. Using the signals LVDS, VCC and GND, the LCD panel control unit 704 generates and provides a gate control signal CTRG for controlling a gate of a TFT, which constitutes the image display region 714b, to the scan drive unit 710, and the LCD panel control unit 704 generates and provides a source data signal DTS and a data drive unit control signal CTRD to the data drive unit 712. The power source signals VCC, GND are also provided to the DC/DC converter 706, the scan drive unit 710, and the data drive unit 712. Using the provided power source signals VDD, GND, the DC/DC converter 706 generates and supplies a power source signal VBS to the gray scale manipulation and VCOM voltage generating unit 708, and generates and supplies power source signals VCG, VGH, VGL to the scan drive unit 710. Using the power source signal VBS, the gray scale manipulation and VCOM voltage generating unit 708 generates signals VCOM, GAMMA and supplies the signal VCOM to the scan drive unit 710 and the signals GAMMA, VCOM to the data drive unit 712.

The scan drive unit 710, the data drive unit 712 and the switch control unit 718 are operated as described above. That is, the scan drive unit 710 causes the rows of the TFT sensor array 714 to be sequentially activated in the image display mode, and renders the TFTs of the all of the rows to be turned off in the fingerprint recognition mode. In addition, the data drive unit 712 applies data signals to the rows of the TFT LCD panel 714b activated in the above manner. The sensor array control unit 724 drives the switch control unit 716 in a separate timing and the switch control unit 716 sequentially activates the rows in the fingerprint recognition region 716 in order to execute the fingerprint recognition mode, so that fingerprint image signals formed in the fingerprint recognition region 714a are outputted to the reading unit 718 for each frame. The fingerprint image signals outputted in this manner are supplied to the sensor array control unit 724 and the sensor array controller 724 identifies a person's identity by comparing the signals with the image signals which have been stored in the memory 726. The person's identity identified in this manner is supplied to the host 728 via the sensor interface 730, and the host 728 displays the identity in a form capable of being identified by the user.

The finger print recognition device 700 as shown in FIG. 7 can be formed concurrently with manufacturing active components in the liquid crystal display device.

According to the present invention as described above, it becomes possible to simultaneously form photosensitive sensor devices, each comprising a sensor thin film transistor, a switch thin film transistor and an electricity charging unit, on respective pixels inside of an array substrate provided with one or more active components or within a color filter substrate of a liquid crystal display device. Therefore, both image display and fingerprint recognition can be performed by one liquid display device, and thus it is possible to minimize the increase in price and size of a final product caused by buying and mounting a separate fingerprinting recognition device.

The effects achieved by the present invention are summarized as follows:

i) Because a photosensitive sensor of a thin film transistor type, which reads and converts optical type image information into an electric signal, may be formed concurrently with producing a TFT array substrate in a liquid crystal panel to be included in the TFT array substrate, it is possible to construct a fingerprint recognition system in a mobile phone, a notebook computer, a personal portable terminal, a monitor, a television or the like;

ii) Because a photosensitive sensor and a TFT array substrate which have been produced in different production lines and by separate manufacturing processes may be concurrently produced in the same production line and by the same manufacturing process, it is possible to reduce the manufacturing time and costs;

iii) Because it is possible to reduce the occurrence of additional costs in designing and providing a fingerprint recognition device in the associated products, it is advantageous in view of the price of product; and iv) The present invention is widely applicable, so that its utility value can be enhanced in the sphere of everyday life (e.g., an approval system for electronic commerce using an Internet) as well as in the security field. Furthermore, because it becomes easy to manufacture associated products, demand for a TFT-LCD can be increased.

The above embodiments have been specifically described in connection with fingerprint recognition. However, the present invention can be embodied as an image sensor for other purposes. The preferred embodiment of the present invention has been described for illustrative purposes, and those skilled in the art will appreciate that various modifications, additions and substitutions are possible, without departing from the scope and spirit of the invention as disclosed in the accompanying claims.

What is claimed is:

1. A liquid crystal display (LCD) panel comprised of:
    a single panel lying in a single plane, having a first plurality of thin film transistors (TFTs) arranged in rows, said rows of TFTs in the panel being capable of displaying images throughout said single panel in a display mode; and
    a second plurality of TFTs in a fingerprint detection area of the single panel, which is within a first area of the single panel, said second plurality of TFTs being a subset of said first plurality of TFTs said TFTs in the fingerprint detection area being capable of both actively displaying images in said display mode and generating signals that represent a fingerprint touching the single panel in the fingerprint detection area in a fingerprint recognition mode;
    wherein the single panel further comprises a scan drive unit which sequentially turns on rows of the first plurality of TFTs and the second plurality of TFTs to display images in the display mode, and a data drive unit which outputs data signals to a turned-on row provided in the image display panel, and
    wherein the fingerprint detection area comprises a switch control unit which sequentially turns on rows of TFTs in the fingerprint detection area in order to perform fingerprint recognition in the fingerprint detection area of the single panel, and a reading unit, to which fingerprint information recognized from a turned-on row is outputted.

2. The liquid crystal display device according to claim 1, wherein the fingerprint detection area is formed from an array of fingerprint recognition components, each of the fingerprint recognition components comprising: a sensor thin film transistor, in which a photosensitive layer is formed between a first end and a second end of the sensor thin film transistor, and when light exceeding a predetermined amount of light is incident into the photosensitive transistor, the first end and the second end become electrically conductive; and a switch thin film transistor, in which a gate of the switch thin film transistor is connected to an output terminal of the switch control unit, a first end of a channel of the switch thin film transistor is connected to a second end of a channel of the sensor thin film transistor and a second end of the channel of the switch thin film transistor is connected to an input terminal of the reading unit.

3. The liquid crystal display device according to claim 2, wherein the second end of the channel of the sensor thin film transistor and the first end of the channel of the switch thin film transistor are connected to a transparent electrode.

4. The liquid crystal display device according to claim 2, wherein the sensor thin film transistor and the switch thin film transistor are formed on a transparent substrate, and the liquid crystal display device further comprises a light-emitting unit under the transparent substrate.

5. The liquid crystal display device according to claim 2, further comprising an electricity charging unit, wherein one end of the charging unit is connected to the second end of the channel of the sensor thin film transistor and to the first end of the channel of the switch thin film transistor, and electric charges generated from the sensor thin film transistor are accumulated in the electricity charging unit.

6. The liquid crystal display device according to claim 2 further comprising a light shut-off layer formed on the top of the switch thin film transistor.

* * * * *